United States Patent
Lo et al.

(10) Patent No.: US 10,691,413 B2
(45) Date of Patent: Jun. 23, 2020

(54) BLOCK FLOATING POINT COMPUTATIONS USING REDUCED BIT-WIDTH VECTORS

(71) Applicant: Microsoft Technology Licensing, LLC, Redmond, WA (US)

(72) Inventors: Daniel Lo, Bothell, WA (US); Eric S. Chung, Woodinville, WA (US); Douglas C. Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/971,904

(22) Filed: May 4, 2018

(65) Prior Publication Data

US 2019/0339937 A1    Nov. 7, 2019

(51) Int. Cl.
| | |
|---|---|
| *G06F 7/483* | (2006.01) |
| *G06F 7/544* | (2006.01) |
| *G06F 17/16* | (2006.01) |
| *G06N 3/04* | (2006.01) |

(52) U.S. Cl.
CPC ............ *G06F 7/483* (2013.01); *G06F 7/5443* (2013.01); *G06F 17/16* (2013.01); *G06N 3/04* (2013.01)

(58) Field of Classification Search
CPC ............................... G06F 7/5443; G06F 17/16
See application file for complete search history.

(56) References Cited

U.S. PATENT DOCUMENTS

| | | | |
|---|---|---|---|
| 6,504,838 B1 * | 1/2003 | Kwan | G10L 25/90 370/352 |
| 2018/0157465 A1 * | 6/2018 | Bittner | G06F 7/483 |
| 2018/0322095 A1 * | 11/2018 | Longley | G06F 7/5443 |
| 2019/0018673 A1 * | 1/2019 | Langhammer | G06F 7/509 |

OTHER PUBLICATIONS

Chung, et al., "Hardware Node Having a Matrix Vector Unit with Block-Floating Point Processing" Application as Filed in U.S. Appl. No. 15/680,649, filed Aug. 18, 2017, 45 Pages.
Drumond, et al., "End-to-End DNN Training with Block Floating Point Arithmetic", In Journal of the Computing Research Repository, Apr. 4, 2018, 9 Pages.
"International Search Report and Written Opinion Issued in PCT Application No. PCT/US19/029025", dated Aug. 13, 2019, 12 Pages.
Senning, et al., "Block-Floating-Point Enhanced MMSE Filter Matrix Computation for MIMO-OFDM Communication Systems", In IEEE 20th International Conference on Electronics, Circuits, and Systems (ICECS), Dec. 8, 2013, pp. 787-790.

* cited by examiner

*Primary Examiner* — Chuong D Ngo

(57) ABSTRACT

A system for block floating point computation in a neural network receives a block floating point number comprising a mantissa portion. A bit-width of the block floating point number is reduced by decomposing the block floating point number into a plurality of numbers each having a mantissa portion with a bit-width that is smaller than a bit-width of the mantissa portion of the block floating point number. One or more dot product operations are performed separately on each of the plurality of numbers to obtain individual results, which are summed to generate a final dot product value. The final dot product value is used to implement the neural network. The reduced bit width computations allow higher precision mathematical operations to be performed on lower-precision processors with improved accuracy.

20 Claims, 7 Drawing Sheets

BLOCK FLOATING POINT COMPUTATIONS USING REDUCED BIT-WIDTH VECTORS

BACKGROUND

Block floating point numeric format allows for scaling dynamic range and precision independently. By lowering precision, system performance of processors, such as of hardware accelerators, can be increased. However, lowered precision can affect system accuracy. For example, block floating point numeric format can be used in neural networks that may be implemented in many application domains for tasks such as computer vision, robotics, speech recognition, medical image processing, computer games, augmented reality, virtual reality and others. While the lowered precision can increase the performance in different functions of the neural network, including the speed at which classification and regression tasks for object recognition, lip reading, speech recognition, detecting anomalous transactions, text prediction, and many others are performed, neural network accuracy can be adversely affected.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for block floating point computation in a neural network comprises receiving block floating point vectors comprising mantissas and decomposing each of the block floating point vectors into a plurality of block floating point vectors having reduced bit-width mantissas. The method further comprises performing dot product operations on the plurality of block floating point vectors have reduced bit-width mantissas and using a result of performing the dot product operations to implement the neural network.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to perform block floating point computations using reduced bit-width vectors. For example, a block floating point vector is decomposed into multiple smaller bit-width block floating point vectors to perform operations thereon. Thereafter, a higher bit-width block floating point vector is constructed by combining the results of the operations performed on the smaller bit-width block floating point vectors. This precision fusion of block-floating point numbers results in a reduced computational burden by allowing higher precision mathematical operations to be performed with lower-precision hardware (e.g., a lower-precision hardware accelerator), while improving accuracy.

With various examples of the present disclosure, neural networks, such as deep neural networks (DNNs), can be more efficiently trained and operated using smaller bit-width block floating point vectors that allow for higher-precision arithmetic on a lower-precision block floating point compute engine. For example, in a neural network implemented using block floating point, the present disclosure allows for selectively increasing the precision of certain layers, thereby improving the overall network accuracy with minimal performance impact. It should be noted that the various examples described herein can be applied to computations performed with respect to weights and/or activations for some or all of the layers in the neural network. That is, the present disclosure can be implemented in training and/or operating a neural network.

As a result of performing the operations described herein, processing time and processing resources for training and operating the neural network are reduced without the traditionally-expected corresponding decrease in system accuracy. In this manner, when a processor is programmed to perform the operations described herein, the processor is used in an unconventional way, and allows for the more efficient training or operation of the neural network.

Figure 1:
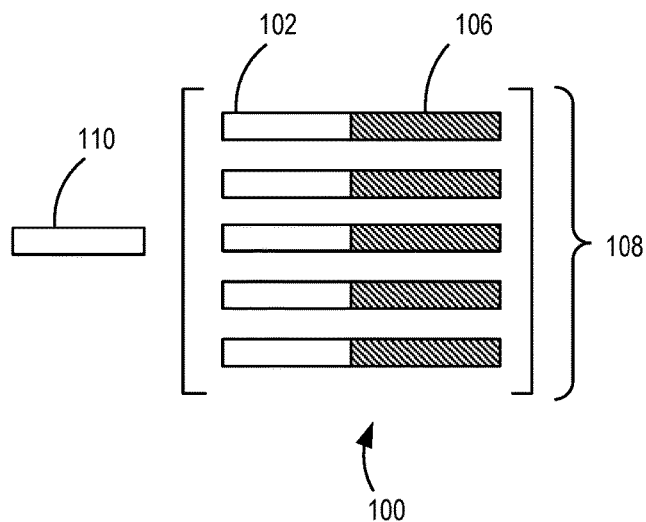
FIG. 1 is an exemplary block diagram illustrating a block floating point format according to an embodiment.

With reference to FIG. 1, reduced bit-width block floating point vectors are decomposed or derived versions of higher bit-width block floating point vectors 100. That is, in the higher bit-width block floating point vectors 100, each number is expressed with a sign 102, a mantissa 106, and a shared exponent 110, wherein the mantissa has B bits. Thus, a group of numbers 108 shares and exponent in various examples.

In one example, the reduced bit-width block floating point vectors have a reduced mantissa bit-width, for example, B/2 bits. For example, a large range of values can be expressed using only a few bits of mantissa. For example, with 4-bits of mantissa and a 5-bit exponent, values can be expressed in a range of $[2^{-14}0.001_2, 2^{15}1.111_2] \approx [2^{-17}, 2^{16}]$. In contrast, a 4-bit fixed-point number can only express values in a range from $[0001_2, 1111_2] \approx [2^0, 2^4]$. Thus, it should be appreciated that the computational "cost" of mathematical operations, such as dot product operations including matrix-vector multiplies and matrix-matrix multiplies are reduced by using the vectors with reduced mantissa widths according to the present disclosure.

Figure 2:
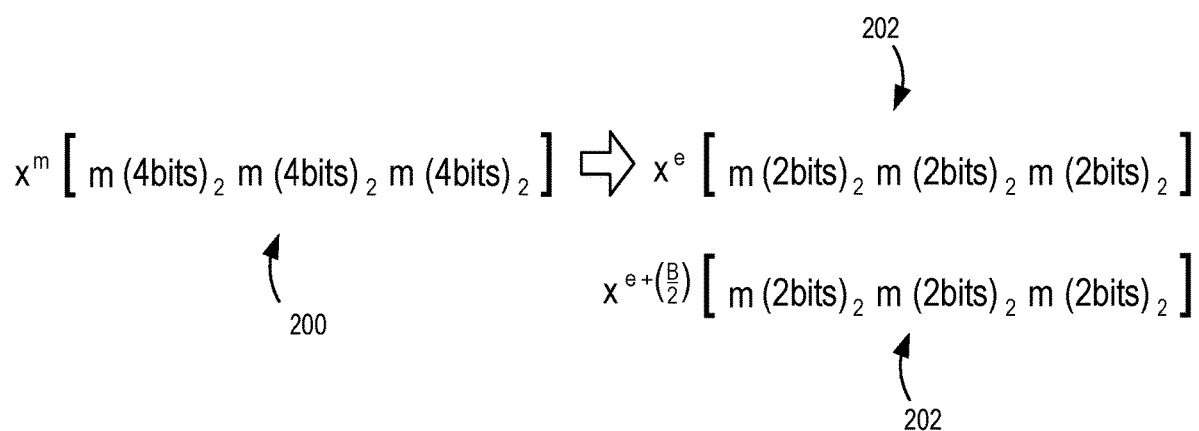
FIG. 2 illustrates decomposing a block floating point vector according to an embodiment.

For example, as illustrated in FIG. 2 a block floating point vector 200, illustrated as having mantissa portions with mantissas each of four bits (i.e., a higher bit-width block floating point vector) can be decomposed into multiple block floating point vectors 202, illustrated as having mantissa portions with mantissas each of two bits (i.e., lower bit-width block floating point vectors). As should be appreciated, in some examples, the exponent portion (e) for one of the block floating point vectors 202 is scaled, such as based on whether the mantissa portion corresponds to higher or lower bits in the mantissa values. For example, the exponent portion for the higher bit portions is increased by the number of total bits (B) corresponding to the bits in the original mantissa value divided by the split value. In this example, where the 4-bit mantissa values are decomposed into 2-bit mantissa values, the increase is two bits, such that the exponent for the higher mantissa bits is $x^{e+2}$.

More particularly, if a block floating point vector is defined as:

$$x = 2^e[(-1)^{s1}m_1 (-1)^{s2}m_2 \ldots (-1)^{sN}m_N] = 2^e s * \vec{m},$$

where * is an element-wise multiplication, and each mantissa $m_i$ is represented using B bits, then the block floating point vector x is decomposed into two block floating point vectors each using $\lceil B/2 \rceil$ bits for the mantissas as follows:

$$x = 2^e s * \vec{m}_{low} + 2^{e + \lceil \frac{B}{2} \rceil} s * \vec{m}_{high} \qquad \text{Eq. 1}$$

In Eq. 1, e is the exponent value, B is the number of bits in the original mantissa (non-decomposed block floating point value), $\vec{m}_{low}$ are the lower position mantissa bits (least significant bits corresponding to the lower-order mantissa bits) and $\vec{m}_{high}$ are the higher position mantissa bits (most significant bits corresponding to the higher-order mantissa bits).

As a particular example, a block floating point vector with 4-bit mantissas can be decomposed into two block floating point vectors using 2-bit mantissas as follows:

$$x = 2^3[1110_2\ 1010_2\ 0111_2] = 2^3[10_2\ 10_2\ 11_2] + 2^5[11_2\ 10_2\ 01_2].$$

More generally, a block floating point vector with B bits can be decomposed into k block floating point vectors using $\lceil B/k \rceil$. Conversely, higher bit-width block floating point vectors can be constructed from smaller bit-width block floating vectors. Thus, it should be appreciated that the present disclosure can be applied to block floating point vectors having different bit-widths that can be decomposed into two or more reduced bit-width block floating point vectors. Additionally, as can be seen, the exponent values are scaled up to $2^5$ from $2^3$.

In operation, computations can be performed using the reduced bit-width block floating point vectors, which simplifies the mathematical calculations to be performed. That is, the decomposition of block floating point vectors according to the present disclosure allows for implementing higher-precision arithmetic on a lower-precision block floating point compute engine. For example, the dot product of a 2B-bit block floating point vector x and a B-bit block floating point vector y can be decomposed as follows:

$$(2^{e_x}\vec{m}_{x,low} + 2^{e_x + B}\vec{m}_{x,high}) \cdot (2^{e_y}\vec{m}_y) =$$
$$2^{e_x + e_y}\vec{m}_{x,low} \cdot \vec{m}_y + 2^{e_x + B + e_y}\vec{m}_{x,high} \cdot \vec{m}_y \qquad \text{Eq. 2}$$

It should be noted that for simplicity, in Eq. 2, the signs are omitted, which can be easily re-introduced to the mantissa dot product.

Thus, block floating point vector decomposition to reduce the mantissa bit-width can be implemented on B-bit block floating point hardware as two B-bit block floating point dot products. The present disclosure can be implemented with a B-bit block floating point vector x and a 2B-bit block floating point vector y as described herein. The present disclosure can also be implemented, for example, with a 2B-bit block floating point vector and 2B-bit block floating point vector y using four B-bit dot products. As should be appreciated, the herein described precision fusion can be implemented for dot products, as well as for operations consisting of dot products, such as matrix-vector multiplication and matrix-matrix multiplication. The decomposition described herein can also be generalized to increase precision by factors greater than two.

The decomposition process described herein is not limited to block floating point numeric formats, but can be applied to other numeric formats. Additionally, the present disclosure can be applied to non-neural network applications, such as other applications wherein dot product operations are performed.

Figure 3:
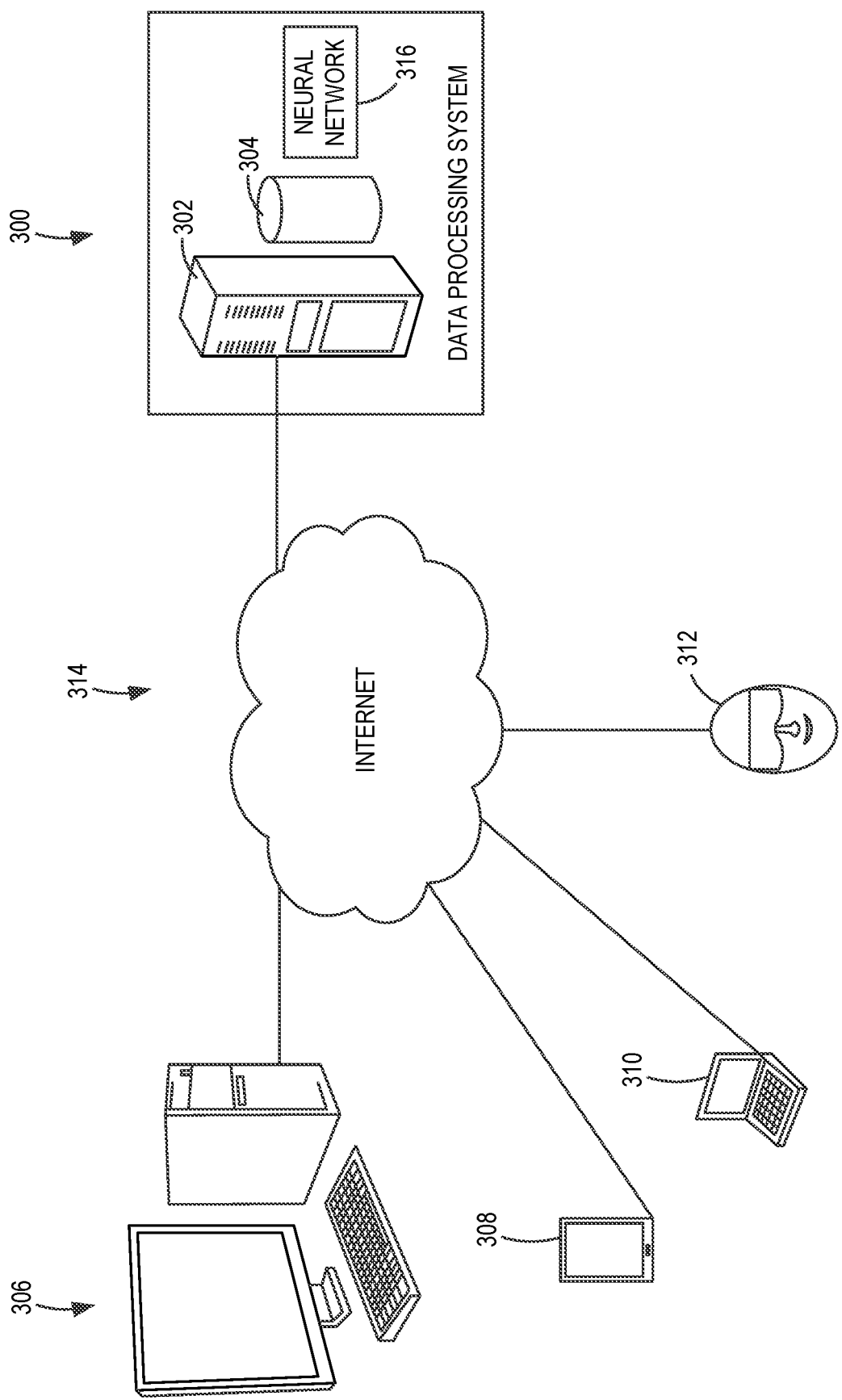
FIG. 3 is an exemplary block diagram illustrating a data processing system according to an embodiment.

The decomposition process to generate reduced bit-width block floating point vectors can be implemented in a data processing system 300 (e.g., an image processing system) deployed as a cloud service as illustrated in FIG. 3. In this example, the data processing system 300 implements the decomposition process described herein to allow for higher level computations to be performed with lower level processing engines. The data processing system 300 includes one or more computers 302 and storage 304 to store, for example, neural network data, including training data (e.g., polygon data meshes or numerical training values) and/or trained model data in some examples. It should be appreciated that other data, such as neural network inference data, or other non-neural network data can be stored in the storage 304 and processed by the one or more computers 302 using the present disclosure.

The data processing system 300 is connected to one or more end user computing devices in some examples, such as a desktop computer 306, a smart phone 308, a laptop computer 310 and an augmented reality head worn computer 312 (e.g., Microsoft HoloLens®). For example, the data processing system 300 is shown as connected to the end user computing devices via a computer network 314, illustrated as the Internet.

The data processing system 300 receives input data, such as neural network inputs (e.g., numerical data, image data, etc.) from an end user computing device or server. The data is uploaded to the data processing system 300 for processing, such as for neural network inference processing with computations using reduced bit-width block floating point vectors as described herein. It should be appreciated that some or all of the data processing system 300 or the functionality of the data processing system 300 can be implemented within the end user computing device.

The data processing system 300 in this example implements a neural network 316 that performs computations (or is optionally trained) according to the present disclosure using a reduced bit-width block floating point vector computation engine. When the neural network 316 is trained, a large amount of data (e.g., three-dimensional (3D) objects) can be processed and stored in a database, such as in the storage 304, which can be processed more quickly and/or with lower precision processing engines (while providing improved accuracy of higher precision processing engines) according the present disclosure. In some examples, the functionality of the data processing system 300 described herein is performed, at least in part, by one or more hardware logic components. For example, and without limitation, illustrative types of hardware logic components that are used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Thus, with the present disclosure, reduced bit-width block floating point vectors can be used for dot product operations thus enabling higher precision mathematical operations to be performed with a low-precision computation engine (e.g., a lower precision accelerator) that can also improve accuracy. As such, computational accuracy can be improved while having the reduced "cost" (e.g., computational and/or storage requirements) of the arithmetic operations being performed by using lower-precision processing engines. For example, in a neural network application, most of the computation "cost" of DNNs is in matrix-vector and matrix-matrix multiplications, which can be performed according to the present disclosure using the reduced bit-width block floating point vectors. It should be noted that the decomposition process in some examples is performed within the FPGA.

Figure 4:
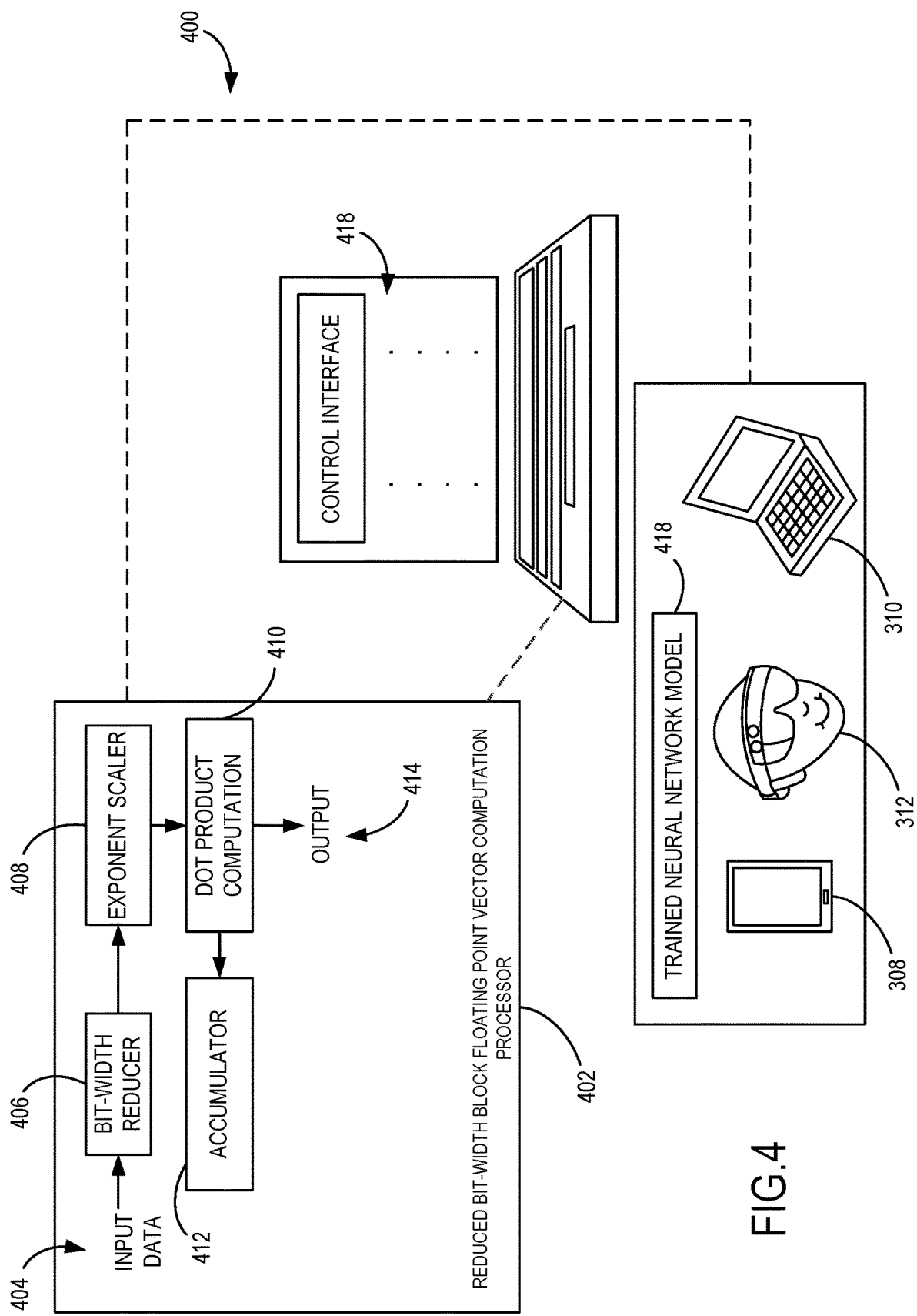
FIG. 4 is an exemplary schematic block diagram of a neural network system according to an embodiment.

Various examples include a neural network system 400 as illustrated in FIG. 4. The neural network system 400 in one example uses back propagation and/or other training techniques as described herein. The neural network system 400 includes a reduced bit-width block floating point vector computation processor 402 that is configured in some examples as a processing engine that uses reduced bit-width mantissas for block floating point calculations. It should be noted the present disclosure can be applied to different types of neural networks implemented using block floating point. In some example, by selectively increasing the precision of certain parts of the neural network, the overall network accuracy can be improved with minimal performance impact. It should be noted that the processes described herein can applied to various different neural network computations, such as for weight updating and/or activations for some or all the layers of the neural network.

The reduced bit-width block floating point vector computation processor 402 has access to input data 404, such as inference data or training data. For example, the reduced bit-width block floating point vector computation processor 402 accesses DNN model data (e.g., block floating point data) as the input data 404 for use in classification and regression tasks in a wide variety of application domains such as object recognition, lip reading, speech recognition, detecting anomalous transactions, text prediction, and many others. In another example, the reduced bit-width block floating point vector computation processor 402 accesses training data for training the neural network using neural network processing technology. The reduced bit-width block floating point vector computation processor 402 uses reduce mantissa bit-width processing to reduce the processing requirements for performing inference, training, or other operations, while maintaining or improving a system accuracy. Thus, higher precision mathematical operations can be performed on lower-precision processors to allow for an improved overall system accuracy (e.g., allowing more iterative computations to be performed in a lesser amount of time).

In the illustrated example, the input data 404 includes a plurality of block floating point vectors each comprising a mantissa portion and an exponent portion. The reduced bit-width block floating point vector computation processor 402 initially processes the input data 404 with a bit-width reducer component 406 (which may be configured as a sub-module of the reduced bit-width block floating point vector computation processor 402) that is configured to reduce the bit-width of the mantissa portions of the plurality of block floating point vectors. The bit-width reduction in some examples includes reducing the bit-width of the mantissa portion in half. However, other fractional reductions in the mantissa portion bit-width are contemplated.

The bit-width reducer component 406 in one example reduces a bit-width of the plurality of block floating point vectors by decomposing each of the plurality of block floating point vectors into a plurality of vectors each having a mantissa portion with a bit-width that is smaller than a bit-width of the mantissa portion of the original plurality of block floating point vectors of the input data 404. For example, the reduced bit-width mantissa portions can be generated according to Eq. 1 or Eq. 2 described above. Thus, in some examples, a plurality of block floating point reduced bit-width vectors are generated for each original block floating point vector of the input data 404.

A scaler, which is illustrated as an exponent scaler 408, is configured to then scale the reduced bit-width block floating point vectors, which in some examples includes scaling the exponent portion of one or more of the reduced bit-width block floating point vectors, such as based on the mantissa portion within the reduced bit-width vector. For example, as described herein, the reduced bit-width vector having the higher order bits of the split mantissa portion has a scaling factor added to the exponent value for that reduced bit-width vector, such as according to Eq. 1 or Eq. 2 described above.

A dot product computation component 410 then performs dot product operations separately on each of the block floating point vectors having the reduced mantissa portions. That is, the reduced bit-width block floating point vectors for each set of reduced mantissa portions is processed. For example, matrix-vector computations including one or more dot product operations are performed separately on the reduced bit-width mantissa portions to obtain individual results. Individual results are thereby obtained for each of the reduced bit-width mantissa block floating point vectors.

Thus, in various examples, the dot product operations result in individual results for each of the reduced bit-width vectors that are then summed by an accumulator 412 (e.g., summing or accumulation component) to generate a final dot product value as an output 414. The output 414 is then used in some examples to implement the neural network.

Figure 5:
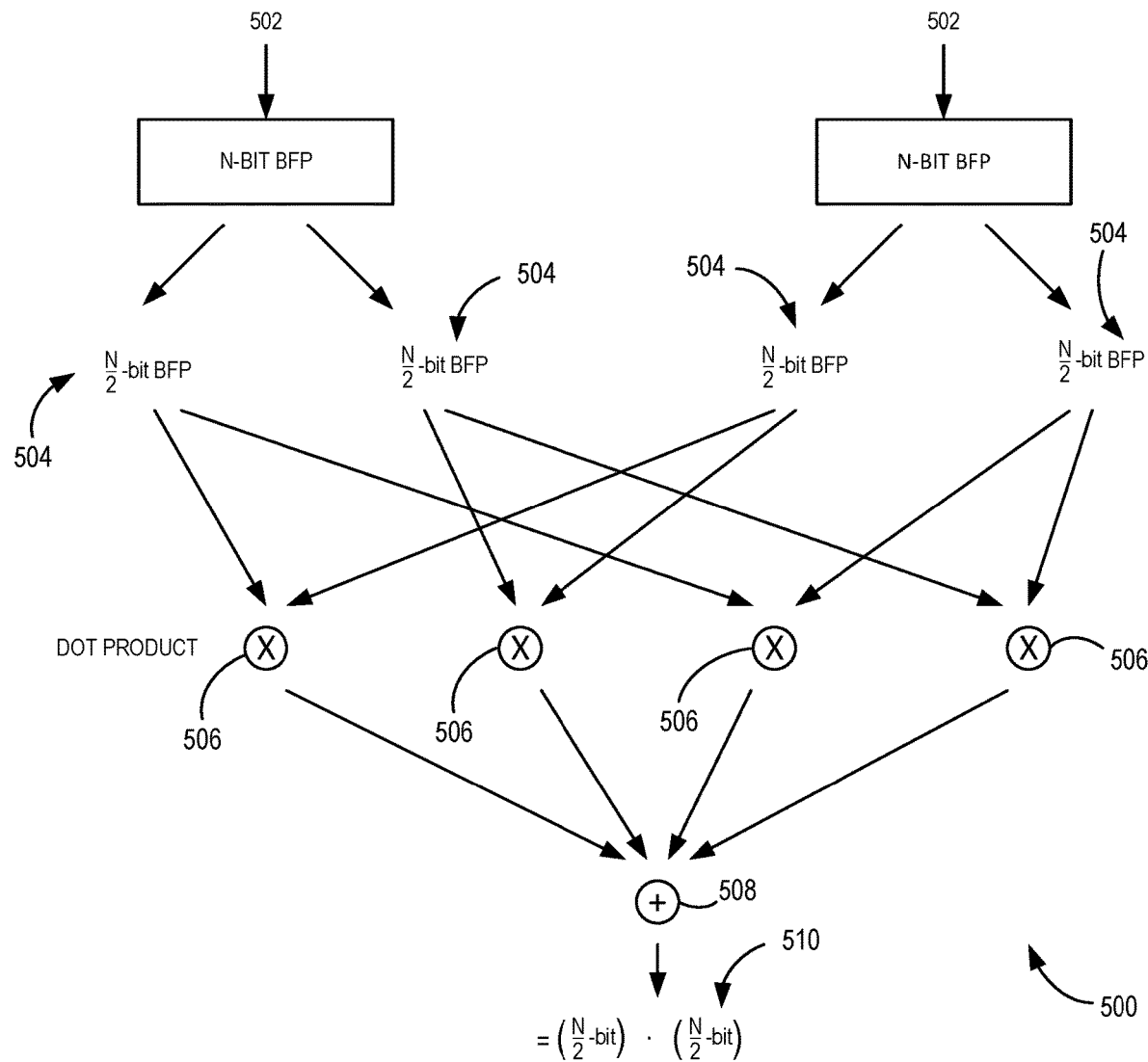
FIG. 5 illustrates dot product computations performed on reduced bit-width numbers according to an embodiment.

For example, the dot product computation component 410 and the accumulator 412 are configured to perform reduced mantissa bit-width computations 500 as illustrated in FIG. 5. In the illustrated example, two N-bit block floating point vectors 502 are each decomposed to generate two N/2-bit block floating point vectors 504. Dot products operations are performed including first performing multiplication functions 506, which are then combined with an accumulation function 508 to generate the dot product output 510, which corresponds to (N-bit block floating point vector)·(N-bit block floating point vector). Thus, individual results are obtained, which are then accumulated to generate the output 414.

It should be noted that the operations performed for the reduced mantissa bit-width computations 500 can be performed in hardware and/or software. For example, the operations to decompose the vectors into vectors having reduced bit-width mantissas can be performed in hardware and/or software.

In various examples, the dot product operations compute a scalar product of two vectors, such as $a=[a_1, a_2, \ldots, a_n]$ and $b=[b_1, b_2, \ldots, b_n]$, as follows:

$$a \cdot b = \Sigma_{i=1}^n a_i b_i = a_1 b_1 + a_2 b_2 + \ldots + a_n b_n \qquad \text{Eq. 3}$$

In Eq. 3, $\Sigma$ denotes the summation and n is the dimension of the vector space. In operation, a row vector is multiplied by a column vector. In general, the matrix is a rectangular array of numbers, symbols, or expressions that are arranged in rows and columns, and individual items in a matrix are commonly referred to as elements or entries. Matrices are often used to represent linear transformations, that is, generalizations of linear functions such as $f(x)=ax$. As such, the matrices can be used, for example, to project 3D images onto a two-dimensional (2D) screen or to perform calculations used to create realistic-seeming motion, among many other applications.

The present disclosure can be applied to different matrices, such as a sparse matrix that is a matrix populated primarily with zeros, or a dense matrix that is a matrix where a significant number of elements (e.g. a majority) are not zeros. Sparse matrices are useful in various application areas such as, for example, network theory where it is common to have a low density of significant data or connections represented by non-zero values interspersed throughout a far greater number of zero values. It should further be noted that the present disclosure can be implemented in connection with different types of matrices and is not limited to the matrices described herein. For example, the operations described herein can be performed in combination with different sparse matrix formats, such as a coordinate format, a compressed space row format, or other formats, such as a diagonal sparse matrix format or a bit-vector format.

Thus, the above-described reduced bit-width mantissa computations can be used in many different applications performed lower-precision or lower-performance processors, while still maintaining a level of accuracy suitable for a particular purpose or use (e.g., in a neural network).

With reference again to FIG. 4, the reduced bit-width block floating point vector computation processor 402 is configured to use reduced bit-width mantissa block floating point vectors to reduce the complexity and processing burden, which can improve accuracy by allowing higher precision mathematical operations to be performed in lower-precision processors. As a result, when processing a large set of data, lower-precision processors can be used without the conventional reduction in accuracy. For example, the reduced bit-width block floating point vector computation processor 402 is configured to use the reduced bit-width mantissa block floating point vectors for matrix-vector multiplication operations. These operations can be performed as part of performing inference functions for a neural network. As another example, the operations can be performed as part of a training process for the neural network, such as when performing computations during the forward pass, back propagation and weight updating in the training process.

In one example, the reduced bit-width block floating point vector computation processor 402 has details of the neural network topology (such as the number of layers, the types of layers, how the layers are connected, the number of nodes in each layer, the type of neural network), which can be specified by an operator. For example, an operator is able to specify the neural network topology using a graphical user interface 416. When the neural network is trained, a large amount of 3D objects can be processed and stored in a database. For example, the database can include identifiers corresponding to thousands of 3D objects in an image processing application.

Once the operator has configured one or more inference or training tuning parameters, or in some cases, using a pre-defined set of parameters (that can be automatically selected), the reduced bit-width block floating point vector computation processor 402 is configured to perform neural network inference or training computations to operate or train the neural network using neural network functions or neural network training processes in the neural network technology. It should be noted that in examples where neural network training is performed, once the training is complete (for example, after the training data is exhausted) a trained neural network model 418 (e.g., topology and parameter values) is stored and loaded to one or more end user devices such as the smart phone 308, the wearable augmented reality computing device 312, the laptop computer 310 or other end user computing device. The end user computing device is able to use the trained neural network model 418 to carry out the task for which the neural network has been trained. For example, in the case of the wearable augmented reality computing device 312, an engine is opened to recognize assets being looked at by the wearer of the wearable augmented reality computing device 312 and the trained neural network model 418 is used to understand how the assets are oriented, whether the asset is opened, etc.

When the present disclosure is applied, for example, to a DNN, in one example, pre-trained model parameters are used in a quantized model. The quantized model uses the operators described herein to model the quantization error around matrix-vector multiplies. It should be noted that quantized model quantizes both the model parameters as well as the activations in the network. The resulting model is then used to run inference on validation or new data to determine the accuracy of the quantized model.

If the accuracy does not meet a predefined threshold, the accuracy is further improved through fine tuning. In this case, the quantized model is used to fine tune the model parameters. Again, the model parameters are initialized using the ones trained in floating point. Training data is then run through the model, using the losses from the quantized model to further train the model.

Thus, the decomposition operations performed according to the present disclosure can be implemented in different applications, such as neural network applications (as described herein) or image processing applications, among others. As one specific example, the decomposition operations can be performed as part of matrix-vector multiples for a fully connected layer of a neural network to train the neural network as follows:

$$y_0 = \sigma(x_0 W + b) - \text{forward pass} \qquad \text{Eq. 4}$$

$$L = f(y_0^* - y_0) - \text{loss calculation, where } f \text{ is a loss function} \qquad \text{Eq. 5}$$

$$\nabla W = dL/dW - \text{back propagation to calculate gradients} \qquad \text{Eq. 6}$$

$$W_{\{t+1\}} = W_t + \eta \cdot \nabla W - \text{weight update} \qquad \text{Eq. 7}$$

In the above equations, W is a weight, b is a bias term, $\sigma$ represents non-linearity, $y_0$ is the input, $y_0^*$ is the expected output, and $\eta$ is a learning rate. The difference of $y_0^*$ and $y_0$ (i.e., $y_0^* - y_0$) is back propagated to calculate gradients used to update neural network weights. It should be noted that while the above-described equations generally correspond to a one-layer network, the present disclosure can be implemented in connection with different types of networks having multiple layers.

During neural training using Eqs. 4-7, certain operations, including the $x_0W$ operation, include matrix-vector multiplication. In various examples, the matrix-vector multiplication is performed using block floating point vectors decomposed to have reduced bit-width mantissas as described herein.

As another example, the decomposition process described herein can be implemented in connection with convolution operations as follows:

$$\sigma(\text{conv}(x, W) + b) \qquad \text{Eq. 8}$$

Similar to Eqs. 4-7, Eq. 8 includes convolution operations (cony) that consists of dot product computations. In various examples, the dot product computations are performed using block floating point vectors decomposed to have reduced bit-width mantissas as described herein. It should be noted that the convolution operations can be one-dimensional (1D) or two-dimensional (2D) operations in different applications.

Thus, the above-described reduced bit-width mantissa vector computations can be used in many different applications performed with lower precision processors to facilitate an improved overall system accuracy.

Figure 6:
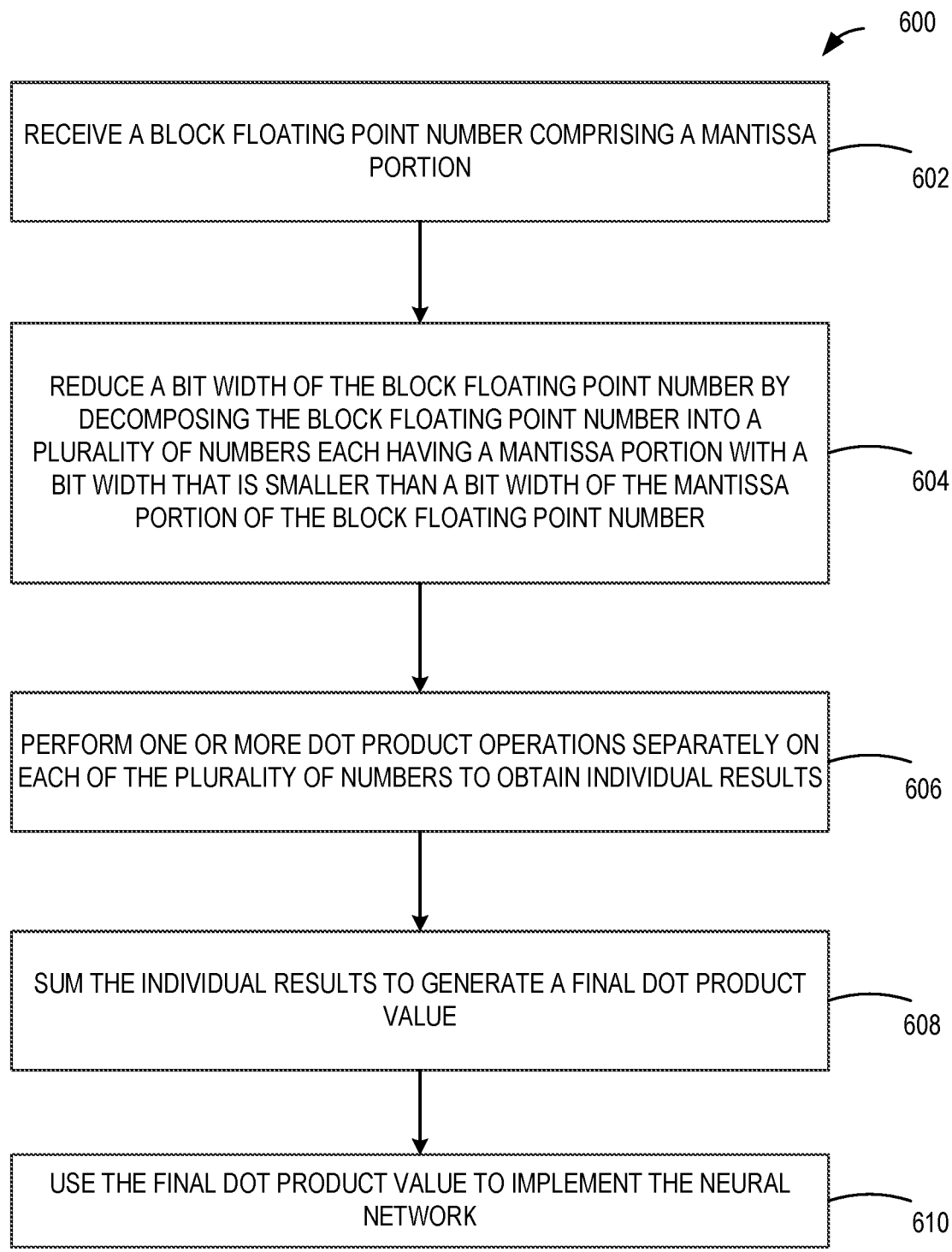
FIG. 6 is an exemplary flow chart illustrating operations of a computing device for performing reduced bit-width mantissa block floating point computations according to various embodiments.
Figure 7:
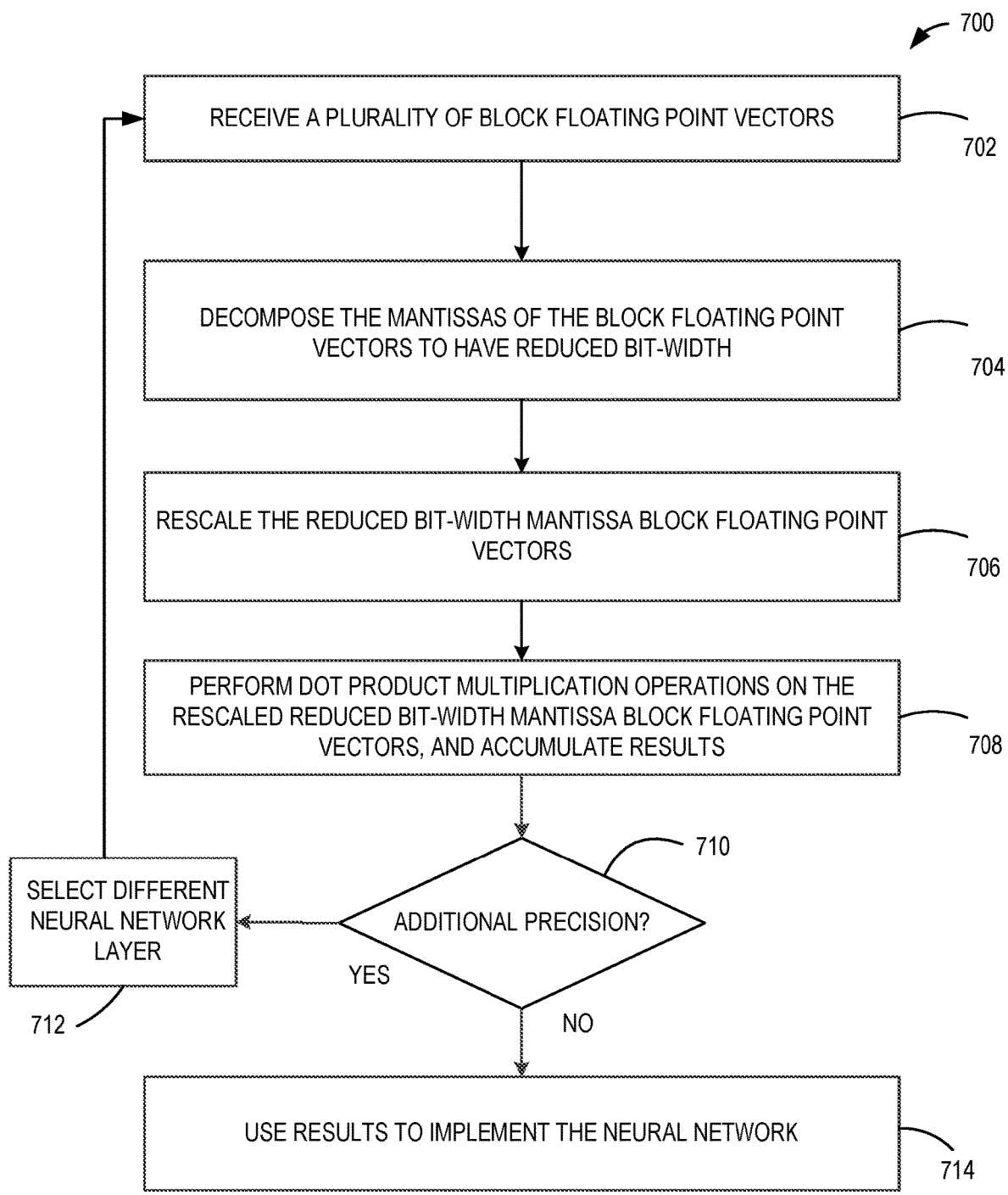
FIG. 7 is another exemplary flow chart illustrating operations of a computing device for performing reduced bit-width mantissa block floating point computations according to various embodiments.

As should be appreciated, the various examples can be used to train, or in the operation of different types of neural networks. Additionally, the various examples can be used to perform reduced bit-width mantissa computations in non-neural applications. FIGS. 6 and 7 illustrate exemplary flow charts of methods 600 and 700 for performing reduced bit-width mantissa vector computations in a neural network. The operations illustrated in the flow charts described herein can be performed in a different order than is shown, can include additional or fewer steps and can be modified as desired or needed. Additionally, one or more operations can be performed simultaneously, concurrently or sequentially.

With reference to the method 600, the computing device receives a block floating point number at 602. The block floating point number may be a vector value that includes a mantissa portion and an exponent portion (and a sign portion in various examples). The block floating point number in some examples is part of a matrix (e.g., matrix values in a block floating point format) and on which dot product operations are to be performed. For example, the numbers can be part of a data training set for training the neural network or data for use in inference operations of the neural network.

The method 600 includes reducing a bit-width of the block floating point number at 604. The bit-width is reduced in one example by decomposing the block floating point number into a plurality of numbers each having a mantissa portion with a bit-width that is smaller than a bit-width of the mantissa portion of the block floating point number. In some examples, a block floating point vector is decomposed into two block floating vectors having a mantissa bit-width that is half of the bit-width of the original block floating point vector.

The method 600 includes performing one or more dot product operations separately on each of the plurality of numbers to obtain individual results at 606. In some examples, when dot product operations are being performed, such as on block floating point vectors, an exponent value of the reduced bit-width mantissas is scaled based on the bit-width position of the values of the mantissa (e.g., least significant bits or most significant bits). The dot product operations can be performed as shown in FIG. 5, illustrating two N-bit block floating point vectors being processed according to the present disclosure.

The method 600 includes summing the individual results at 608 to generate a final dot product value. For example, the accumulation function 508 (as illustrated in FIG. 5) is used to combine the dot product multiplication operations of the reduced bit-width mantissa vectors. Thus, individual multiplication operation results are accumulated to generate a final dot product value.

The final dot product value is then used to implement the neural network at 610. For example, the results of the computations using the reduced bit-width mantissa numbers are used to train or operate the neural network.

Thus, the reduced bit-width mantissa block floating point computations can be used in the operation or in the training process for the neural network in various examples (e.g., training involves using a training algorithm to update parameters of the neural network in an iterative process). The computations, such as the iterative process that is performed during neural network training, can be time consuming and computationally expensive since the number of parameters to be updated is large (in the case of DNNs) and the amount of training data is also large. The present disclosure handles the demands of the training process by allowing processing engines or machines with lower precision to efficiently perform the computation operations, while maintaining and overall system accuracy.

It should be noted that the present disclosure can be implemented in a neural network having a layered configuration with a layer of input nodes, one or more layers of hidden units and at least one output layer. During use of the neural network at test time (i.e., after training) as a signal passes through a layer, the signal produces an output via the activations that becomes the input to the next layer of the neural network and so on, until the signal reaches the output layer and the output units are activated. The pattern of activations at the output layer gives the prediction of the neural network. The pattern of activations is influenced by the weights learned during the training phase or stage.

With reference now to the method 700 illustrated in FIG. 7, which can be performed, for example, by the reduced bit-width block floating point vector computation processor 402, at 702, block floating point vectors are received. In various examples, and as discussed herein, the block floating point vectors are defined by values having a sign, exponent and mantissa. The block floating point numbers can be in different formats, such as, 32-bit float, 16-bit float or 8-bit float, among others.

The mantissas of the block floating point vectors are decomposed at 704 to have a reduced bit-width. For example, as described herein, the mantissas are fractionally divided (e.g., in half) to define a plurality of block floating point vectors having a reduced bit-width (e.g., N/2 bit-width block floating point vectors from an N bit block floating point vector).

The reduced bit-width mantissa block floating point vectors are rescaled at 706.

As described herein, in some examples, lower bit position values (e.g., least significant bits) split into a reduced bit-width block floating point vector are not scaled, while higher bit position values (e.g., most significant bits) split into a reduced bit-width block floating point vector are scaled.

Dot product multiplication operations are performed on the rescaled reduced bit-width mantissa block floating point vectors at 708, for example, as illustrated in FIG. 5. The results of the dot product multiplication operations are also accumulated at 708 to generate a final dot product value. With calculations being performed using the reduced bit-width mantissa block floating point vectors, higher accuracy can be achieved with lower performing processors, such as low-precision accelerators.

A determination is then made at 710 whether additional precision in calculations is desired or needed. For example, a determination is made whether overall system accuracy should be further increased. If operations to provide additional precision are to be performed, then at 712 a different neural network layer is selected. The selection of the layer can be predefined or user defined. Once the neural network layer has been selected, the method returns to 702.

If no additional precision is needed or desired, the results of the computations at 710 (performed in one or more layers) are used to implement the neural network at 714 as described herein.

Thus, the method 700 can be applied to neural networks implemented using block floating point to selectively increase the precision of certain layers, resulting in the overall network accuracy being improved using lower-precision processors. The method 700 can be applied to computations relating to the weights and/or activations for some or all of the layers of the neural network.

As should be appreciated, when the present disclosure is implemented in the training process for neural networks, this generally involves using a training algorithm to update parameters of the neural network in an iterative process. Moreover, the neural network is a collection of nodes interconnected by edges and where there are weights associated with the nodes and/or edges. In some examples, one or more of the nodes in the neural network is modified to slightly change the way the neural network operates. Thus, the outputs themselves are not directly changed, but indirectly changed by changing how the nodes operate to generate the outputs using calculations performed according to the present disclosure.

Thus, in some examples, the method 600 or method 700 can be used to perform computations implementing reduced bit-width mantissa block floating point vectors for training or operating neural networks.

Exemplary Operating Environment

Figure 8:
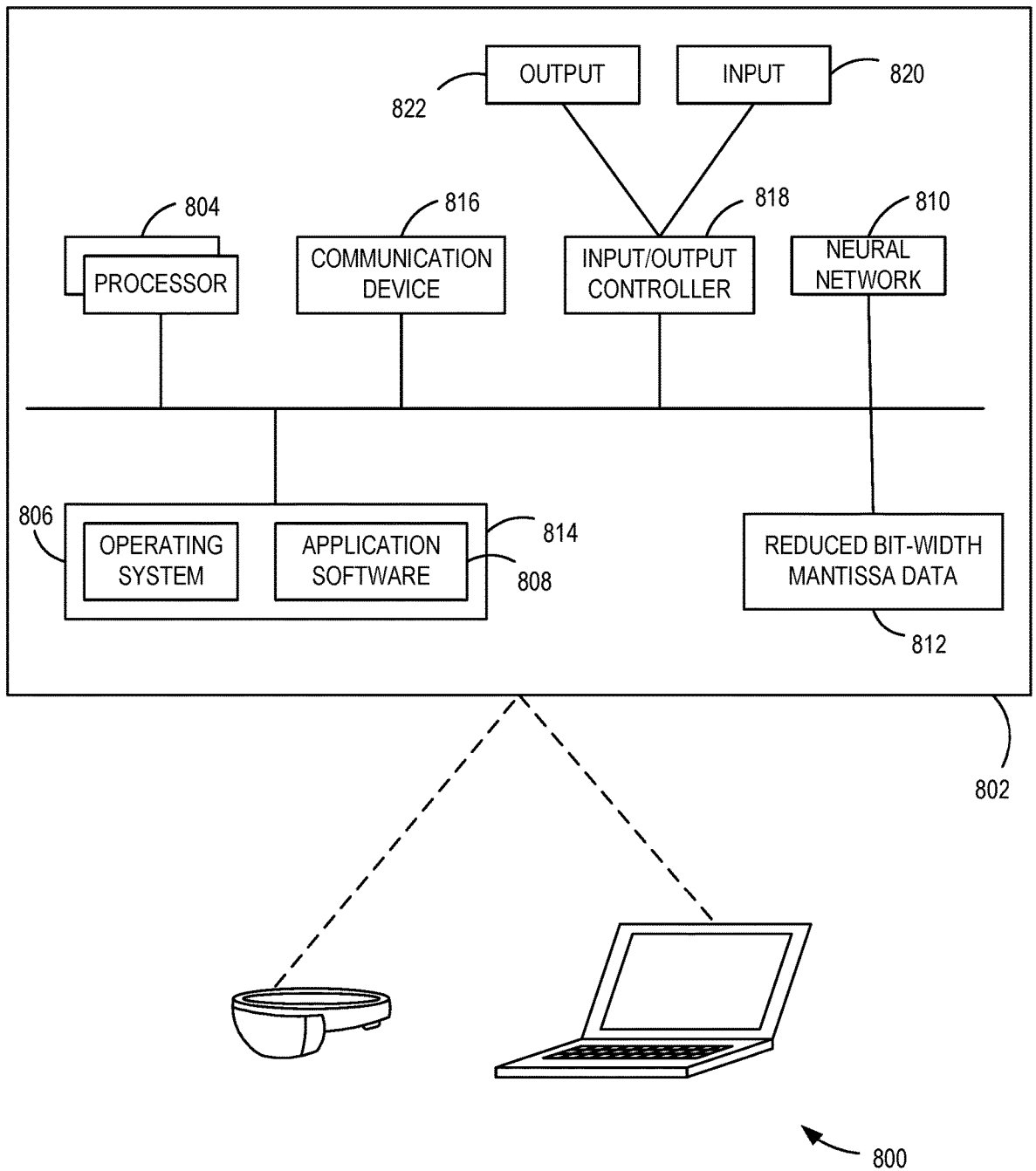
FIG. 8 illustrates a computing apparatus according to an embodiment as a functional block diagram.

The present disclosure is operable with a computing apparatus 802 according to an embodiment as a functional block diagram 800 in FIG. 8. In one example, components of the computing apparatus 802 may be implemented as a part of an electronic device according to one or more embodiments described in this specification. The computing apparatus 802 comprises one or more processors 804 which may be microprocessors, controllers or any other suitable type of processors for processing computer executable instructions to control the operation of the electronic device. Platform software comprising an operating system 806 or any other suitable platform software may be provided on the apparatus 802 to enable application software 808 to be executed on the device. According to an embodiment, a neural network 810 that operates or is trained using reduced bit-width mantissa data 812 can be accomplished by software.

Computer executable instructions may be provided using any computer-readable media that are accessible by the computing apparatus 802. Computer-readable media may include, for example, computer storage media such as a memory 814 and communications media. Computer storage media, such as the memory 814, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 814) is shown within the computing apparatus 802, it will be appreciated by a person skilled in the art, that the storage may be distributed or located remotely and accessed via a network or other communication link (e.g. using a communication interface 816).

The computing apparatus 802 may comprise an input/output controller 818 configured to output information to one or more input devices 820 and output devices 822, for example a display or a speaker, which may be separate from or integral to the electronic device. The input/output controller 818 may also be configured to receive and process an input from the one or more input devices 820, for example, a keyboard, a microphone or a touchpad. In one embodiment, the output device 822 may also act as the input device 820. An example of such a device may be a touch sensitive display. The input/output controller 818 may also output data to devices other than the output device 822, e.g. a locally connected printing device. In some embodiments, a user may provide input to the input device(s) 820 and/or receive output from the output device(s) 822.

In some examples, the computing apparatus 802 detects voice input, user gestures or other user actions and provides a natural user interface (NUI). This user input may be used to author electronic ink, view content, select ink controls, play videos with electronic ink overlays and for other purposes. The input/output controller 818 outputs data to devices other than a display device in some examples, e.g. a locally connected printing device.

The functionality described herein can be performed, at least in part, by one or more hardware logic components. According to an embodiment, the computing apparatus 802 is configured by the program code when executed by the processor(s) 804 to execute the embodiments of the operations and functionality described. Alternatively, or in addition, the functionality described herein can be performed, at least in part, by one or more hardware logic components. For example, and without limitation, illustrative types of hardware logic components that can be used include FPGAs, ASICs, ASSPs, SOCs, CPLDs, and GPUs.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:
A system for block floating point computation in a neural network, the system comprising:
at least one processor; and
at least one memory comprising computer program code, the at least one memory and the computer program code configured to, with the at least one processor, cause the at least one processor to:
receive a block floating point number comprising a mantissa portion;
reduce a bit-width of the block floating point number by decomposing the block floating point number into a plurality of numbers each having a mantissa portion with a bit-width that is smaller than a bit-width of the mantissa portion of the block floating point number;
perform one or more dot product operations separately on each of the plurality of numbers to obtain individual results;
sum the individual results to generate a final dot product value; and
use the final dot product value to implement the neural network.

Other examples include:
A computerized method for block floating point computation in a neural network, the computerized method comprising:
receiving block floating point vectors comprising mantissas;
decomposing each of the block floating point vectors into a plurality of block floating point vectors having reduced bit-width mantissas;
performing dot product operations on the plurality of block floating point vectors have reduced bit-width mantissas; and
using a result of performing the dot product operations to implement the neural network.

Other examples include:
One or more computer storage media having computer-executable instructions for block floating point computation that, upon execution by a processor, cause the processor to at least:
receive a block floating point number comprising a mantissa portion;
reduce a bit-width of the block floating point number by decomposing the block floating point number into a plurality of numbers each having a mantissa portion with a bit-width that is smaller than a bit-width of the mantissa portion of the block floating point number;
perform one or more dot product operations separately on each of the plurality of numbers to obtain individual results;
sum the individual results to generate a final dot product value; and
use the final dot product value to implement the neural network.

Alternatively, or in addition to the examples described above, examples include any combination of the following:
reduce the bit-width of the block floating point number by splitting the block floating point number into a higher bit position mantissa portion and a lower bit position mantissa portion.
wherein the higher bit position mantissa portion and the lower bit position mantissa portion represent higher order and lower order mantissa bits, respectively, scale the higher and lower bit position mantissa portions before summing the individual results.
scale the higher and lower bit position mantissa portions using a fractional value based on a size of the bit-width of the mantissa portion of the plurality of numbers and a size of the bit-width of the mantissa portion of the received block floating point number.
perform reducing the bit-width in one of hardware and software and perform the one or more dot product operations is performed only in hardware.
wherein performing one or more dot product operations comprises performing one of matrix-vector multiply operations and matrix-matrix multiply operations.
wherein the block floating point number comprises a single-precision floating point number.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for training a neural network. The illustrated one or more processors 804 together with the computer program code stored in memory 814 constitute exemplary processing means for using and/or training neural networks.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for block floating point computation in a neural network, the system comprising:
    at least one processor; and
    at least one memory comprising computer program code, the at least one memory and the computer program code configured to, with the at least one processor, cause the at least one processor to:
    receive a block floating point number comprising a mantissa portion and an exponent portion;
    reduce a bit-width of the block floating point number by decomposing the block floating point number into reduced bit-width block floating point numbers each having an exponent portion and a mantissa portion, and with a bit-width of the mantissa portion of each of the reduced bit-width block-floating point numbers that is smaller than a bit-width of the mantissa portion of the block floating point number;
    scale the reduced bit-width block floating point numbers, wherein the scaling includes scaling the exponent portion of the reduced bit-width block floating point numbers based on the mantissa portion within the reduced bit-width block floating point numbers;
    perform one or more dot product operations separately on each of the reduced bit-width block floating point numbers to obtain individual results;
    sum the individual results to generate a final dot product value; and
    use the final dot product value to implement the neural network.

2. The system of claim 1, wherein the at least one memory and the computer program code are further configured to, with the at least one processor, cause the at least one processor to reduce the bit-width of the block floating point number by splitting the block floating point number into a higher bit position mantissa portion and a lower bit position mantissa portion.

3. The system of claim 2, wherein the higher bit position mantissa portion and the lower bit position mantissa portion represent higher order and lower order mantissa bits, respectively, and wherein the at least one memory and the computer program code are further configured to, with the at least one processor, cause the at least one processor to scale the higher and lower bit position mantissa portions before summing the individual results, wherein exponent values of the higher bit position mantissa portion and the lower bit position mantissa portion are scaled based on a bit-width position of the higher order and lower order mantissa bits.

4. The system of claim 3, wherein the at least one memory and the computer program code are further configured to, with the at least one processor, cause the at least one processor to scale the higher and lower bit position mantissa portions using a fractional value based on a size of the bit-width of the mantissa portion of the reduced bit-width block floating point numbers and a size of the bit-width of the mantissa portion of the received block floating point number.

5. The system of claim 1, wherein reducing the bit-width is performed in one of hardware and software and performing the one or more dot product operations is performed only in hardware.

6. The system of claim 1, wherein performing one or more dot product operations comprises performing one of matrix-vector multiply operations and matrix-matrix multiply operations.

7. The system of claim 1, wherein the block floating point number comprises a single-precision floating point number.

8. A computerized method for block floating point computation in a neural network, the computerized method comprising:
    receiving block floating point vectors comprising mantissas and exponents;
    decomposing each of the block floating point vectors into a plurality of block floating point vectors having reduced bit-width mantissas;
    scaling the block floating point vectors having reduced bit-width mantissas, wherein the scaling includes scaling the exponents based on the mantissas within the block floating point vectors having reduced bit-width mantissas;

performing dot product operations on the plurality of block floating point vectors have reduced bit-width mantissas; and using a result of performing the dot product operations to implement the neural network.

9. The computerized method of claim 8, wherein decomposing each of the block floating point vectors comprises reducing the bit-width of the mantissas of the block floating point vectors by splitting the mantissas of the block floating point vectors into a higher bit position mantissa portion and a lower bit position mantissa portion.

10. The computerized method of claim 9, wherein the higher bit mantissa portion and the lower bit mantissa portion represent higher order and lower order mantissa bits, respectively, and further comprising scaling the higher and lower bit mantissa portions before performing the dot product operations.

11. The computerized method of claim 10, further comprising scaling the higher and lower bit mantissa portions using a fractional value based on a size of the bit-width of the mantissa portion of the plurality of block floating point vectors and a size of the bit-width of the mantissa portion of the received block floating point vectors.

12. The computerized method of claim 8, wherein decomposing each of the block floating point vectors is performed in one of hardware and software, and performing dot product operations is performed only in hardware.

13. The computerized method of claim 8, wherein performing the dot product operations comprises performing one of matrix-vector multiply operations and matrix-matrix multiply operations.

14. The computerized method of claim 8, wherein the block floating vectors comprises single-precision floating point numbers.

15. One or more computer storage media having computer-executable instructions for block floating point computation that, upon execution by a processor, cause the processor to at least:

receive a block floating point number comprising a mantissa portion and an exponent portion;

reduce a bit-width of the block floating point number by decomposing the block floating point number into reduced bit-width block floating point numbers each having an exponent portion and a mantissa portion with a bit-width of the mantissa portion of each of the reduced bit-width block floating point numbers that is smaller than a bit-width of the mantissa portion of the block floating point number;

scale the reduced bit-width block floating point numbers, wherein the scaling includes scaling the exponent portion of the reduced bit-width block floating point numbers based on the mantissa portion within the reduced bit-width block floating point numbers;

perform one or more dot product operations separately on each of the reduced bit-width block floating point numbers to obtain individual results;

sum the individual results to generate a final dot product value; and use the final dot product value to implement the neural network.

16. The one or more computer storage media of claim 15 having further computer-executable instructions that, upon execution by a processor, cause the processor to at least reduce the bit-width of the block floating point number by splitting the block floating point number into a higher bit position mantissa portion and a lower bit position mantissa portion.

17. The one or more computer storage media of claim 16, wherein the higher bit portion and the lower bit portion represent higher order and lower order mantissa bits, respectively, and the one or more computer storage media have further computer-executable instructions that, upon execution by a processor, cause the processor to at least scale the higher and lower bit portions before performing the one or more dot product operations.

18. The one or more computer storage media of claim 17 having further computer-executable instructions that, upon execution by a processor, cause the processor to at least scale the higher and lower bit portions using a fractional value based on a size of the bit-width of the mantissa portion of the reduced bit-width block floating point numbers and a size of the bit-width of the mantissa portion of the received block floating point number.

19. The one or more computer storage media of claim 15, wherein reducing the bit-width is performed in one of hardware and software and performing the one or more dot product operations is performed only in hardware.

20. The one or more computer storage media of claim 15, wherein performing one or more dot product operations comprises performing one of matrix-vector multiply operations and matrix-matrix multiply operations and the block floating point vectors comprise single-precision floating point numbers.

* * * * *